US 9,259,681 B2

(12) United States Patent
Jenkins

(10) Patent No.: US 9,259,681 B2
(45) Date of Patent: Feb. 16, 2016

(54) AIR DRYER

(71) Applicant: HALDEX BRAKE PRODUCTS CORPORATION, Kansas City, MO (US)

(72) Inventor: Michael R. Jenkins, Kansas City, MO (US)

(73) Assignee: HALDEX BRAKE PRODUCTS CORPORATION, Kansas City, MO (US)

(*) Notice: Subject to any disclaimer, the term of this patent is extended or adjusted under 35 U.S.C. 154(b) by 152 days.

(21) Appl. No.: 14/068,701

(22) Filed: Oct. 31, 2013

(65) Prior Publication Data

US 2015/0114223 A1    Apr. 30, 2015

(51) Int. Cl.
*B01D 53/06* (2006.01)
*B01D 45/12* (2006.01)
*B01D 53/26* (2006.01)
*F24F 3/14* (2006.01)
*B60T 1/00* (2006.01)

(52) U.S. Cl.
CPC .............. *B01D 53/261* (2013.01); *B01D 53/06* (2013.01); *B60T 1/00* (2013.01); *F24F 3/1423* (2013.01); *B01D 2257/80* (2013.01); *B01D 2259/40083* (2013.01)

(58) Field of Classification Search
CPC ...... B01D 53/04; B01D 53/06; B01D 53/261; B01D 2257/80; B01D 2259/40089; B01D 2259/4566; F24F 3/1411; F24F 3/1423
USPC .............. 95/107, 113, 117, 121; 96/125, 134; 34/472, 473, 80; 55/DIG. 17
See application file for complete search history.

(56) References Cited

U.S. PATENT DOCUMENTS

| 1,393,335 | A | | 10/1921 | Baldwin |
| 3,784,092 | A | | 1/1974 | Gibson |
| 3,876,400 | A | * | 4/1975 | Frantz ............................. 96/113 |
| 3,945,464 | A | | 3/1976 | Sato |
| 4,097,248 | A | | 6/1978 | Frantz |

(Continued)

FOREIGN PATENT DOCUMENTS

| SU | 1415006 | A | * | 8/1988 |
| SU | 1571366 | A | * | 6/1990 |

OTHER PUBLICATIONS

Cal Supply Company, Inc., The Basics of Compressed Air Dryers, Cal Supply Company, Inc., publically available prior to Oct. 31, 2012, 6 pages, USA.

(Continued)

*Primary Examiner* — Frank Lawrence
(74) *Attorney, Agent, or Firm* — Stinson Leonard Street LLP

(57) ABSTRACT

An air dryer with a rotor and desiccant positioned within an interior chamber of the rotor. The desiccant is positioned within the interior chamber of the rotor between the inlet and the outlet. The desiccant is configured to adsorb at least some of the water contained within air flowing from an inlet to an outlet of the rotor. As the rotor is rotated at a regeneration speed at least some of the water adsorbed by the desiccant moves to the outer surface of the desiccant and at least some of the water is separated from the outer surface of the desiccant. The rotor directs water separated from the outer surface of the desiccant to at least one opening in the rotor. A method for drying air by sending the air through desiccant and rotating the desiccant at a regeneration speed to separate water from the desiccant.

26 Claims, 3 Drawing Sheets

(56) References Cited

U.S. PATENT DOCUMENTS

| | | | |
|---|---|---|---|
| 4,253,315 A | | 3/1981 | Fiedler |
| 4,361,425 A | * | 11/1982 | Hata .............................. 96/140 |
| 4,474,661 A | * | 10/1984 | Nearpass et al. .............. 210/437 |
| 4,478,619 A | * | 10/1984 | Arends et al. .................... 96/132 |
| 4,723,970 A | | 2/1988 | Yokoyama |
| 4,806,134 A | | 2/1989 | Lhota |
| 5,104,520 A | | 4/1992 | Maronde et al. |
| 5,104,541 A | | 4/1992 | Daniel |
| 5,120,694 A | | 6/1992 | Dunne et al. |
| 5,260,242 A | | 11/1993 | Dunne et al. |
| 5,401,706 A | | 3/1995 | Fischer |
| 5,477,014 A | | 12/1995 | Dunne et al. |
| 5,494,586 A | | 2/1996 | Inoue |
| 5,738,710 A | | 4/1998 | Omata et al. |
| 5,762,810 A | | 6/1998 | Pelton et al. |
| 6,056,804 A | | 5/2000 | Keefer et al. |
| 6,406,523 B1 | | 6/2002 | Connor et al. |
| 6,547,003 B1 | | 4/2003 | Bangash et al. |
| 6,581,394 B1 | | 6/2003 | Smolenskiy |
| 6,764,529 B2 | | 7/2004 | Nichols et al. |
| 6,835,236 B2 | * | 12/2004 | Lacey .............................. 96/134 |
| 6,866,950 B2 | | 3/2005 | Connor et al. |
| 7,326,277 B1 | | 2/2008 | Cohen et al. |
| 7,753,069 B2 | | 7/2010 | Nichols et al. |
| 8,079,805 B2 | | 12/2011 | Maier |
| 8,324,523 B2 | | 12/2012 | Foret |
| 2006/0254420 A1 | | 11/2006 | Monereau et al. |
| 2008/0092738 A1 | * | 4/2008 | Nedez .............................. 95/141 |
| 2012/0125198 A1 | | 5/2012 | Vanderstraeten |
| 2013/0052053 A1 | | 2/2013 | Colson et al. |

OTHER PUBLICATIONS

Haldex, The Haldex Consep™, Sep. 2002, 2 pages, Haldex, USA.

Novelaire Technologies Heat & Mass Transfer Products, Desiccant Dehumidication Wheel, Feb. 1, 2004, 6 pages, NovelAire Technologies Heat & Mass Transfer Products, USA.

Meritor WABCO, System Saver TWIN Air Dryer, Maintenance Manual 35, Nov. 2002, 10 pages, Meritor WABCO, USA.

Garphyttan Haldex, Haldex Air Driers give your heavy vehicles clean and dry compressed air., 2007, 6 pages, Garphyttan Haldex, Sweden.

Bendix, Service Data, Bendix® AD-IS® EverFlow™ Assembly, SD-08-2417, Oct. 2007, 10 pages, Bendix Commercial Vehicle Systems LLC, USA.

Haldex, The Haldex DRYest Air Dryer, Jul. 2002, 2 pages, Haldex, USA.

Aeroquip, Aerofiner II™ Air Dryer, Bulletin 2010A, 1985, 6 pages, Aeroquip Corporation, USA.

Haldex, The Haldex PUREest Air Dryer, Sep. 2002, 2 pages, Haldex, USA.

Haldex Midland, Midland Pure Air Plus Air Dryer Troubleshooting Guide, Dec. 1999, 2 pages, Haldex Midland Corporation, USA.

Bendix, Service Data, Bendix® Cyclone DuraDrain™ Trailer Water Separator, SD-08-2402, May 2010, 4 pages, Bendix Commercial Vehicle Systems LLC, USA.

Midland, Midland Pure Air™ Triple Action Air Dryer Systems, Sep. 1990, 4 pages, Midland Brake, Inc., USA.

Bendix, Service Data, Bendix® AD-9™ Air Dryer, SD-08-2412, Jun. 2007, 24 pages, Bendix Commercial Vehicle Systems LLC, USA.

Haldex, Multi-Treatment Cartridge Plus reduces air brake system maintenance costs., Sep. 2006, 2 pages, Haldex Brake Products Corporation, USA.

Haldex, Air Dryer/Airline Products, Jul. 2012, Catalog L00141, 96 pages, Haldex, USA.

International Search Report and Written Opinion for related PCT/US2014/063056 dated Jan. 22, 2015.

* cited by examiner

AIR DRYER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to an air dryer, and more specifically to an air dryer with rotating desiccant.

2. Description of Related Art

The pneumatic braking system of a large, heavy-duty vehicle typically includes an air compressor, a governor for controlling the operating cycle of the air compressor, an air dryer and a reservoir for storing pressurized air for delivery to the brakes. The air compressor operates successively in a loading (compressing) mode and an unloading (non-compressing) mode.

When the pressure in the air reservoir falls below a predetermined minimum pressure, typically about 100 psig, the governor causes the air compressor to operate in the loading mode to compress air for storage in the reservoir. Before the air is stored in the reservoir, it passes through an air dryer that removes moisture and contaminants from the air. When the pressure in the reservoir reaches a desired level, typically about 120 psig, the governor causes the air compressor to operate in the unloading mode and a purge valve in the air dryer opens to the atmosphere.

One type of conventional air dryer includes a removable cartridge with desiccant that dries the compressed air as it flows through the cartridge during the loading mode. During the unloading mode, the governor causes the purge valve in the air dryer to open the inlet of the cartridge to exhaust to atmosphere, the air flow direction is reversed and previously dried compressed air is sent through the cartridge to regenerate the desiccant by removing moisture and contaminants from it. This type of air dryer cannot continuously dry air because the direction of air flow must be reversed in a purge cycle to regenerate the desiccant. Further, regenerating the desiccant in this type of air dryer depletes some of the stored, compressed air that could otherwise be used to operate the brakes. In addition, before air enters the cartridge to be treated by the desiccant, it must be cooled to a sufficient temperature, which is typically accomplished by routing the air through a long cooling line positioned between the air compressor and air dryer.

Another type of air dryer includes dual cartridges each including desiccant that dries compressed air. The air dryer includes an internal valve mechanism that controls air flow through the cartridges. When one cartridge dries air from the air compressor, air from the storage reservoir may be sent in reverse through the other cartridge to regenerate the desiccant. While this type of air dryer may continuously dry air, it depletes the stored, compressed air for regeneration of the desiccant like the single cartridge air dryer described above. Further, it also requires a long cooling line to cool air from the compressor before it enters the air dryer.

BRIEF SUMMARY OF THE INVENTION

The present invention is directed toward an air dryer with a rotor and desiccant positioned within an interior chamber of the rotor. The rotor has an outlet and a plurality of openings at least one of which forms an inlet. The desiccant is positioned within the interior chamber of the rotor between the inlet and the outlet and has an outer surface positioned adjacent to the rotor. The desiccant is configured to adsorb at least some of the water contained within air flowing through the desiccant from the inlet to the outlet. The desiccant is structured so that as the rotor is rotated at a regeneration speed at least some of the water adsorbed by the desiccant moves to the outer surface of the desiccant and at least some of the water is separated from the outer surface of the desiccant. The rotor is structured to direct water separated from the outer surface of the desiccant to at least one of the openings in the rotor. The desiccant is preferably continuously regenerated as the rotor rotates at the regeneration speed, which allows the air dryer to operate continuously as air is supplied to it by an air compressor. Further, substantially all of the air dried by the air dryer may be stored for use in a pneumatic system, such as a vehicle braking system, without being used to regenerate the desiccant.

Preferably, the rotor is positioned inside a housing with an air inlet in fluid communication with the inlet of the rotor, an air outlet in fluid communication with the outlet of the rotor, and a drain in fluid communication with at least one of the openings of the rotor. The housing preferably includes an expansion chamber positioned between the air inlet of the housing and the rotor. In the expansion chamber, air entering the housing expands and cools to condense water contained therein before the air is dried by the desiccant. Because the air is cooled upon entering the housing, a relatively short line or hose may be used to deliver air to the air dryer from an air compressor. The rotor preferably includes a side wall in which the plurality of openings are formed. The side wall is preferably sloped from the openings to the outlet to facilitate the movement of water away from the outlet and toward the openings.

A method for drying air containing water in accordance with the present invention includes sending the air through desiccant so that the desiccant adsorbs at least some of the water. The desiccant is rotated at a regeneration speed that is sufficient to move at least some of the water to an outer surface of the desiccant and separate at least some of the water from the outer surface of the desiccant. Prior to the air being dried by the desiccant, water within the air is preferably condensed by reducing the pressure and temperature of the air within an expansion chamber.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
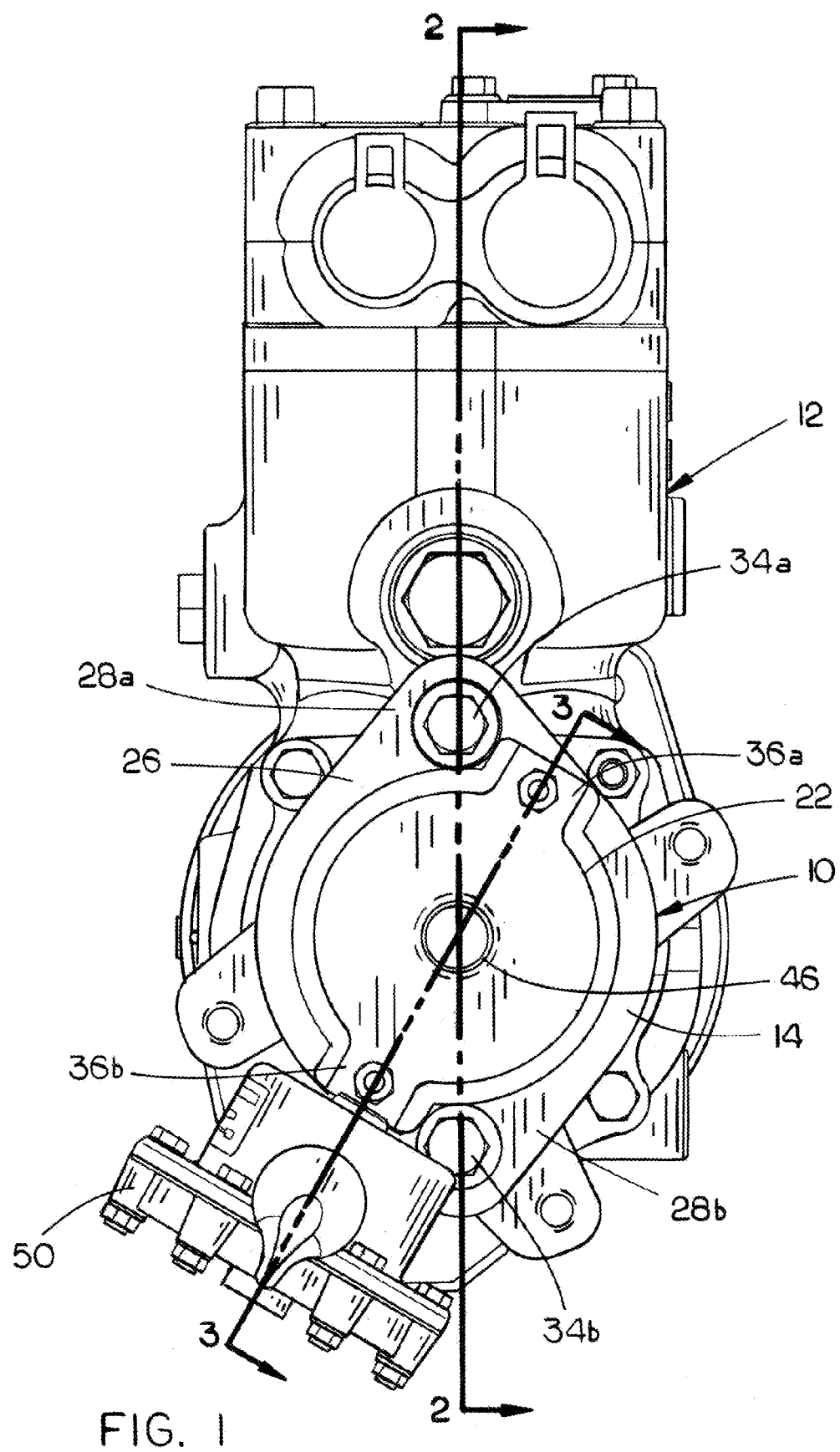
FIG. 1 is a front elevational view of an air dryer in accordance with the present invention joined to an air compressor.
Figure 2:
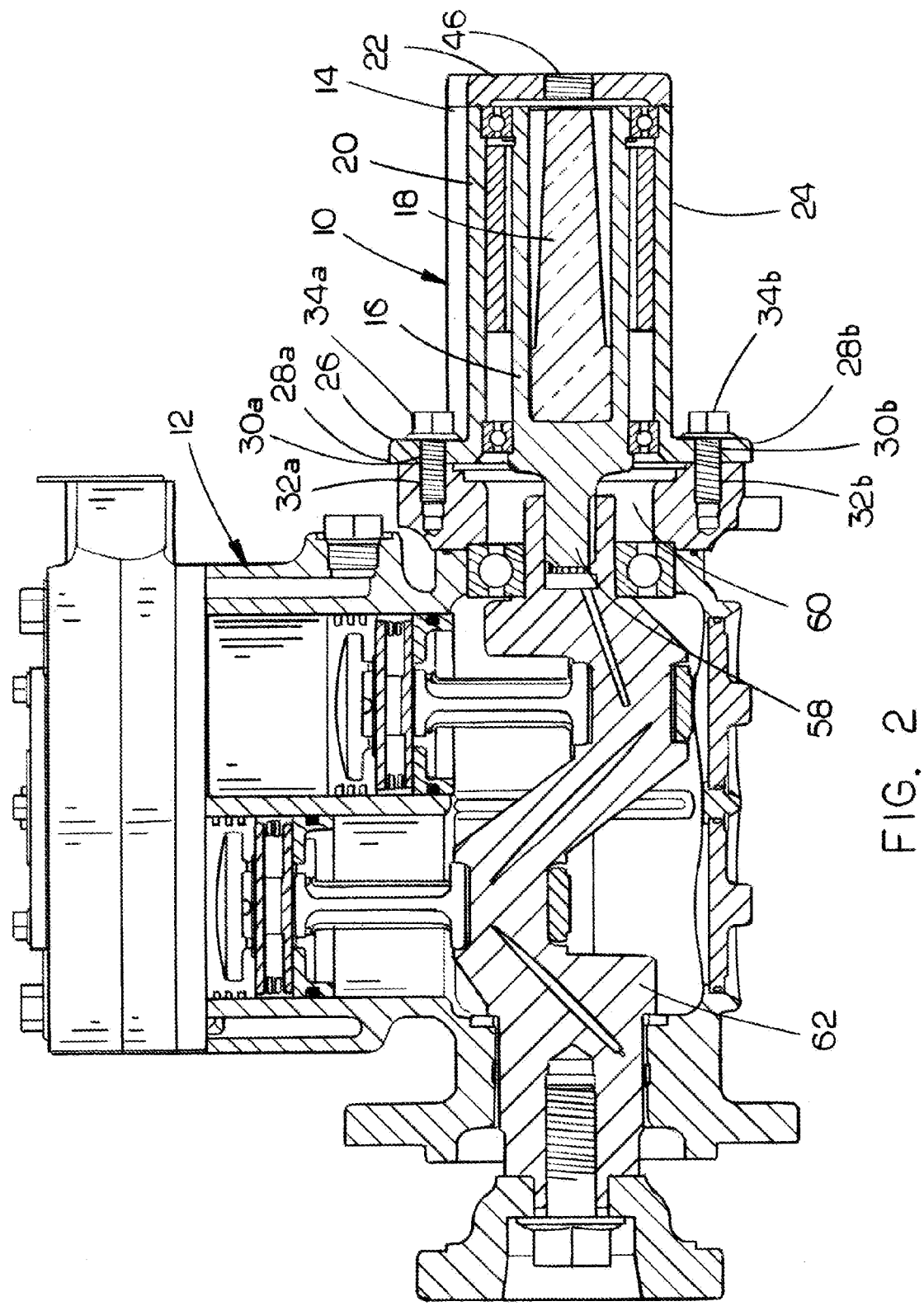
FIG. 2 is a cross-sectional view taken through the line 2-2 in FIG. 1.
Figure 3:
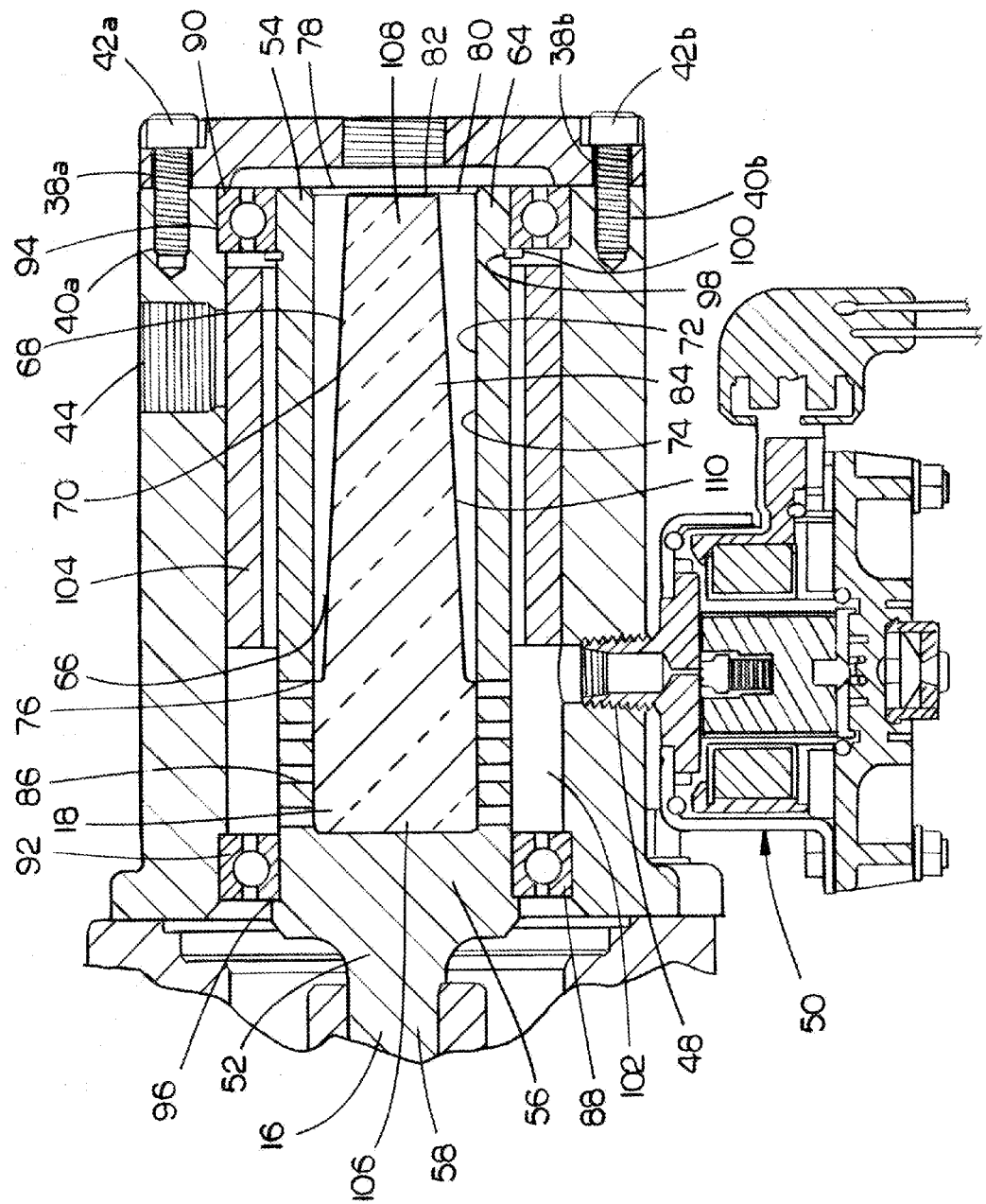
FIG. 3 is a partial cross-sectional view taken through the line 3-3 in FIG. 1.

An air dryer in accordance with the present invention is shown generally as 10 in FIGS. 1-3. The air dryer 10 is configured to mount to a conventional air compressor 12. The air dryer 10 cleans and dries compressed air from the air compressor 12 before the air is stored for use in a pneumatic system. The air dryer 10 and air compressor 12 are preferably used in the pneumatic braking system of a large, heavy-duty vehicle such as a bus, truck, semi-tractor, trailer, construction equipment, or recreational vehicle. The air compressor 12 may be any type of air compressor having a drive through output shaft. Further, it is within the scope of the invention for the air dryer 10 to be connected to any other source of air besides an air compressor for the removal of water and contaminants from the air.

Referring to FIG. 2, air dryer 10 includes a housing 14, a rotor 16 positioned within housing 14, and desiccant 18 positioned within rotor 16. Housing 14 includes a main body 20 and a cap 22. Main body 20 has a cylindrical side wall 24 and a flange 26 integrally formed with one end of side wall 24 and extending generally perpendicular from the side wall 24. Referring to FIG. 1, flange 26 is generally circular with a tab 28a extending upward and a tab 28b extending downward. Referring to FIG. 2, openings 30a and 30b are formed in tabs 28a and 28b, respectively. Openings 30a and 30b are aligned with threaded openings 32a and 32b, respectively, formed in air compressor 12. A screw 34a is received by openings 30a and 32a, and a screw 34b is received by openings 30b and 32b for joining the housing 14 of air dryer 10 to air compressor 12.

As shown in FIG. 1, cap 22 of housing 14 is a generally circular disc with a pair of rectangular tabs 36a and 36b extending from opposite sides of the disc. Referring to FIG. 3, holes 38a and 38b are formed in tabs 36a and 36b, respectively. Holes 38a and 38b are aligned with threaded holes 40a and 40b, respectively, formed in the end of side wall 24 opposite flange 26. A screw 42a is received by holes 38a and 40a, and a screw 42b is received by holes 38b and 40b for joining cap 22 to side wall 24.

Housing 14 has an air inlet 44 (FIG. 3) formed in the top of side wall 24 near cap 22, an air outlet 46 (FIG. 2) formed in the center of cap 22, and a drain 48 formed in the bottom of side wall 24 near air compressor 12. The air inlet 44 is configured for connection to a hose (not shown) that is connected to an outlet of air compressor 12. Due to the proximity of air dryer 10 to air compressor 12, the hose (not shown) connecting the two may be relatively short. The air outlet 46 is configured for connection to a hose (not shown) that is connected to a pneumatic system such as the braking system of a vehicle. The drain 48 is a threaded opening that is configured for connection to an inlet of a conventional automatic drain valve 50. The automatic drain valve 50 receives water and contaminants through drain 48 and expels the water and contaminants to the atmosphere when the brakes are applied on a vehicle to which the air compressor 12 is mounted.

Referring to FIG. 3, rotor 16 has a first end 52 adjacent air compressor 12 and a second end 54. The first end 52 of rotor 16 has a base 56 with a shaft 58 that extends from one side of the base 56. As shown in FIG. 2, shaft 58 extends through an opening 60 in air compressor 12 and is connected to a rotating shaft 62 of air compressor 12. Shafts 58 and 60 are preferably connected via a splined interface.

As shown in FIG. 3, a side wall 64 extends from the opposite side of the base 56 as the shaft 58. Side wall 64 extends between the first end 52 and second end 54 of rotor 16. Side wall 64 is generally cylindrical and is integral with base 56. Side wall 64 defines an interior space into which a desiccant cartridge 66 is inserted. Desiccant cartridge 66 has a side wall 68 with an inner surface 70 that is generally shaped as a truncated cone the cross-sectional diameter of which tapers as it extends from adjacent base 56 to second end 54.

Side wall 68 of desiccant cartridge 66 has a generally cylindrical outer surface 72 with a diameter that is slightly less than a diameter of an inner surface 74 of side wall 64 so that desiccant cartridge 66 may be inserted within side wall 64. Desiccant cartridge 66 has a first end 76 where inner and outer surfaces 70 and 72 meet, and a second end 78, which includes an end wall 80 that extends between inner and outer surfaces 70 and 72. A circular outlet 82 is formed in the center of end wall 80. When desiccant cartridge 66 is inserted within side wall 64, a portion of side wall 64, base 56, inner surface 70 of desiccant cartridge 66, and end wall 80 define an interior chamber 84 that is in fluid communication with outlet 82. In an alternative configuration, the desiccant cartridge 66 may be integrally formed with the remainder of rotor 16 such that desiccant cartridge 66 is not removable. In this configuration, side walls 64 and 68 may be integral.

A plurality of openings 86 are formed in side wall 64 adjacent to the first end 52. Each of the openings 86 is in fluid communication with the interior chamber 84. Side wall 68 of desiccant cartridge 66 extends from the end of the openings 86 to second end 54 of rotor 16. The inner surface 70 of side wall 68 slopes from outlet 82 to openings 86 to facilitate the movement of water and contaminants away from outlet 82 and toward openings 86. The openings 86 function as both an inlet to allow air to enter the interior chamber 84 and as a drain to allow water and contaminants to exit the interior chamber 84.

Rotor 16 is supported within housing 14 by a pair of bearings 88 and 90 each positioned between the side wall 64 of rotor 16 and the side wall 24 of housing 14. The bearings 88 and 90 support the rotor 16 and permit it to rotate relative to housing 14. Annular grooves 92 and 94 are formed in an inner surface of the side wall 24 of housing 14 for retaining bearings 88 and 90, respectively. The base 56 of rotor 16 includes a ledge 96 for retaining bearing 88. The side wall 64 of rotor 16 includes a groove 98 that receives a retaining ring 100 for retaining bearing 90.

An expansion chamber 102 is formed within housing 14 between an inner surface of the side wall 24 (FIG. 2) of housing 14, the side wall 64 of rotor 16 and bearings 88 and 90. Expansion chamber 102 is in fluid communication with the air inlet 44 of the housing 14 and the openings 86 of the rotor 16. Rotor 16 is positioned within housing 14 such that the air inlet 44 of housing 14 is in fluid communication with the openings 86 of rotor 16 via expansion chamber 102, the air outlet 46 (FIG. 2) of housing 14 is in fluid communication with the outlet 82 of rotor 16, and the drain 48 of housing 14 is in fluid communication with the openings 86 of rotor 16 via expansion chamber 102. The expansion chamber 102 is sealed so that air can only flow through it between inlet 44 to openings 86. A coalescing filter 104 is positioned within the expansion chamber 102 to collect and remove oil aerosols from the compressed air entering inlet 44. The coalescing filter 104 is preferably an aluminum mesh, but may be any type of coalescing filter.

Desiccant 18 fills the interior chamber 84 of rotor 16 such that air entering openings 86 must flow through desiccant 18 to reach outlet 82. Desiccant 18 is porous so that air may flow through it. Desiccant 18 has a cylindrical section 106 that abuts side wall 64 and a conical section 108 that abuts side wall 68 of desiccant cartridge 66. An outer surface 110 of desiccant 18 abuts side walls 64 and 68. Desiccant 18 is shaped to conform to the surfaces that define interior chamber 84, and as such the outer surface 110 of the conical section 108 of desiccant 18 is sloped from openings 86 to outlet 82. The cross-sectional diameter of the conical section 108 of desiccant 18 tapers from openings 86 to outlet 82. Desiccant 18 adsorbs water contained within air that flows through the desiccant 18 from openings 86 to outlet 82. Desiccant 18 may be in any suitable form including a monolith preformed in the shape of a cone or a plurality of beads. If desiccant 18 includes a plurality of beads, preferably the beads are placed in a polyester sack (not shown) in order to prevent them from escaping through openings 86. Desiccant 18 may be made from any suitable material including, but not limited to, zeolite. When desiccant 18 needs to be replaced, cap 22 (FIG. 2) is removed from main body 20 via screws 42a and 42b. Desiccant cartridge 66, including desiccant 18, may then be removed from rotor 16 and replaced with a new desiccant cartridge 66.

In operation, air dryer 10 receives compressed air containing water and other contaminants from air compressor 12. The compressed air enters the air dryer 10 through air inlet 44. As the air enters air dryer 10 it expands within expansion chamber 102. As the air expands, its pressure and temperature are reduced. Water within the air condenses as the air temperature and pressure are reduced. The condensed water accumulates on the interior surface of side wall 24 and runs to drain 48. Because the air is immediately cooled after it enters air dryer 10, the compressed air exiting air compressor 12 does not need to be routed through a long cooling line or hose before entering air dryer 10. This permits the hose (not shown) connecting air compressor 12 and air dryer 10 to be relatively short. The outer surface of housing 14 may include cooling fins (not shown) to cool the housing 14 and air within the housing 14 in order to facilitate condensation of the water within the air. Further, the outer surface of rotor 16 may include vanes (not shown) that help to accelerate the air entering air inlet 44 and spin out larger particle contaminants, such as oil and water droplets, that then accumulate on the interior surface of side wall 24 and run to drain 48.

After the air enters expansion chamber 102 it flows through coalescing filter 104, which collects and removes oil aerosols from the compressed air. The air then flows through the openings 86 in rotor 16 and through the desiccant 18. As the air flows through desiccant 18, the desiccant 18 dries the air by adsorbing water contained within the air. The air exits air dryer 10 through air outlet 46 (FIG. 2).

Referring to FIG. 2, as air compressor 12 operates, shaft 62 of air compressor 12 rotates rotor 16 and desiccant 18. As the rotor 16 rotates at a regeneration speed, which is preferably between 1800 to 3300 rpm, centrifugal force causes water adsorbed by desiccant 18 to move within the desiccant 18 toward the outer surface 110 of the desiccant 18. Centrifugal force further causes water on the outer surface 110 of the desiccant 18 to separate from the outer surface 110 and accumulate on side wall 68 of desiccant cartridge 66. Water that accumulates on the side wall 68 moves toward openings 86 and eventually exits rotor 16 through openings 86. The sloped side wall 68 facilitates the movement of water toward openings 86. The water exiting rotor 16 contacts side wall 24 and runs to drain 48. Water and contaminants that pass through drain 48 enter automatic drain valve 50, which expels the water and contaminants whenever the brakes are applied. Because the desiccant 18 of air dryer 10 is continuously regenerated as the air compressor 12 operates, the air dryer 10 can continuously dry air from air compressor 12 without being taken off line to regenerate the desiccant 18.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. An air dryer comprising:
   a rotor comprising one or more walls that define an interior chamber, wherein a plurality of openings are formed in the rotor and are each in fluid communication with the interior chamber, wherein at least one of the openings comprises an inlet, wherein an outlet is formed in the rotor and is in fluid communication with the interior chamber, wherein the inlet is configured to receive air containing water, and wherein at least one of the one or more walls is sloped from at least one of the openings to the outlet; and
   desiccant positioned within the interior chamber between the inlet and the outlet, wherein the desiccant comprises an outer surface positioned adjacent to the rotor, wherein the desiccant is configured to adsorb at least some of the water contained within air flowing from the inlet to the outlet, wherein the desiccant is structured so that as the rotor is rotated at a regeneration speed at least some of the water moves to the outer surface and at least some of the water is separated from the outer surface, and wherein the at least one sloped wall of the rotor is structured to direct water separated from the outer surface to at least one of the openings.

2. The air dryer of claim 1, wherein the one or more walls comprise a side wall, wherein the plurality of openings are formed in the side wall, and wherein the side wall is sloped from at least one of the openings to the outlet.

3. The air dryer of claim 2, wherein the rotor comprises first and second ends and the side wall extends between the first and second ends, wherein the plurality of openings are positioned adjacent to the first end and the outlet is formed in the second end.

4. The air dryer of claim 3, wherein each of the plurality of openings comprises both the inlet and a drain.

5. The air dryer of claim 3, wherein the rotor further comprises a desiccant cartridge that comprises at least a portion of the side wall and defines at least a portion of the interior chamber.

6. The air dryer of claim 2, wherein the desiccant substantially fills the interior chamber and the outer surface of the desiccant abuts the side wall.

7. The air dryer of claim 6, wherein the outer surface of the desiccant is sloped.

8. The air dryer of claim 1, wherein the rotor is coupled with an air compressor shaft.

9. The air dryer of claim 1, further comprising a housing comprising an air inlet, an air outlet, and a drain, wherein the rotor is positioned within the housing such that the air inlet of the housing is in fluid communication with the inlet of the rotor, the air outlet of the housing is in fluid communication with the outlet of the rotor, and the drain is in fluid communication with at least one of the openings.

10. The air dryer of claim 9, wherein an expansion chamber is positioned between an inner surface of the housing and the rotor, wherein the expansion chamber is in fluid communication with the air inlet of the housing, the inlet of the rotor, and the drain of the housing.

11. The air dryer of claim 1, wherein the desiccant comprises a monolith.

12. The air dryer of claim 1, wherein the desiccant comprises a plurality of beads.

13. A method for drying air containing water with a rotor comprising one or more walls defining an interior chamber, wherein a plurality of openings are formed in the rotor and are each in fluid communication with the interior chamber, wherein at least one of the openings comprises an inlet, wherein an outlet is formed in the rotor and is in fluid communication with the interior chamber, wherein desiccant is positioned within the interior chamber between the inlet and the outlet, and wherein at least one of the one or more walls is sloped from at least one of the openings to the outlet, comprising:
  sending the air through the inlet and through the desiccant so that the desiccant adsorbs at least some of the water; and
  rotating the rotor and the desiccant at a regeneration speed sufficient to move at least some of the water to an outer surface of the desiccant and separate at least some of the water from the outer surface of the desiccant, and wherein the at least one sloped wall of the rotor directs water separated from the outer surface to at least one of the openings.

14. The method of claim 13, further comprising condensing at least some of the water before sending the air through the desiccant.

15. The method of claim 14, wherein the water is condensed by reducing the temperature of the air.

16. The method of claim 15, wherein the temperature of the air is reduced by reducing the pressure of the air in an expansion chamber.

17. The method of claim 13, further comprising collecting the water separated from the desiccant.

18. The method of claim 13, wherein the desiccant is rotated by an air compressor.

19. The air dryer of claim 10, wherein the expansion chamber is positioned between the air inlet of the housing and the inlet of the rotor, and wherein the expansion chamber is positioned between the drain of the housing and the inlet of the rotor.

20. An air dryer comprising:
  a housing comprising a first inlet, a first outlet, a drain, and an inner surface;
  a rotor that is at least partially positioned within the housing to form an expansion chamber between the inner surface of the housing and the rotor, wherein the expansion chamber is in fluid communication with the first inlet and the drain of the housing, wherein the rotor comprises an interior chamber, wherein a plurality of openings are formed in the rotor and are each in fluid communication with the interior chamber, wherein at least one of the openings comprises a second inlet that is in fluid communication with the expansion chamber, wherein a second outlet is formed in the rotor and is in fluid communication with the interior chamber and the first outlet of the housing, wherein the second inlet is configured to receive air containing water, wherein the drain of the housing is in fluid communication with at least one of the openings of the rotor, wherein the expansion chamber is positioned between the first inlet of the housing and the second inlet of the rotor, and wherein the expansion chamber is positioned between the drain of the housing and the second inlet of the rotor; and
  desiccant positioned within the interior chamber of the rotor between the second inlet and the second outlet, wherein the desiccant comprises an outer surface positioned adjacent to the rotor, wherein the desiccant is configured to adsorb at least some of the water contained within air flowing from the second inlet to the second outlet, wherein the desiccant is structured so that as the rotor is rotated at a regeneration speed at least some of the water moves to the outer surface and at least some of the water is separated from the outer surface, and wherein the rotor is structured to direct water separated from the outer surface to at least one of the openings.

21. The air dryer of claim 20, wherein the rotor comprises a side wall at least partially defining the interior chamber, and wherein the plurality of openings are formed in the side wall.

22. The air dryer of claim 21, wherein the rotor comprises first and second ends and the side wall extends between the first and second ends, wherein the plurality of openings are positioned adjacent to the first end and the second outlet is formed in the second end.

23. The air dryer of claim 22, wherein each of the plurality of openings comprises both the second inlet and a drain.

24. The air dryer of claim 22, wherein the rotor further comprises a desiccant cartridge that comprises at least a portion of the side wall and defines at least a portion of the interior chamber.

25. The air dryer of claim 21, wherein the desiccant substantially fills the interior chamber and the outer surface of the desiccant abuts the side wall.

26. The air dryer of claim 25, wherein the outer surface of the desiccant is sloped, and wherein the side wall is sloped from at least one of the openings to the second outlet.

* * * * *